United States Patent [19]
Thompson

[11] 4,096,919
[45] Jun. 27, 1978

[54] PROPULSION UNIT FOR SKIERS

[76] Inventor: Richard G. Thompson, 312 County Rd. #5, Stillwater, Minn. 55082

[21] Appl. No.: 719,855

[22] Filed: Sep. 2, 1976

[51] Int. Cl.² .................................... B62M 27/02
[52] U.S. Cl. .......................... 180/6 R; 123/185 A; 180/1 G; 180/10; 180/21; 152/7; 280/DIG. 7; 301/35 R
[58] Field of Search ............... 180/1 G, 6 R, 10, 11, 180/12, 13, 15, 19 R, 33 E, 65 F; 280/DIG. 7; 301/35 R; 152/7; 123/179 SE, 185 A, 185 B, 185 P

[56] References Cited
U.S. PATENT DOCUMENTS

| | | | |
|---|---|---|---|
| 796,222 | 8/1905 | Karmeli | 180/33 E |
| 1,118,341 | 11/1914 | Grant | 180/13 |
| 1,172,456 | 2/1916 | Hoadley | 180/65 F |
| 1,245,896 | 11/1917 | Fuqua | 180/10 X |
| 1,309,928 | 7/1919 | Wolfard | 180/10 |
| 1,374,761 | 4/1921 | Pomilio | 180/10 X |
| 1,379,464 | 5/1921 | Martin | 180/10 |
| 2,242,915 | 5/1941 | Koski | 152/7 |
| 2,432,107 | 12/1947 | Williams | 180/10 X |
| 2,787,845 | 4/1957 | Manning | 180/10 X |
| 3,169,581 | 2/1965 | Cummins | 280/DIG. 7 |
| 3,193,038 | 7/1965 | Cronkright | 180/6 R X |
| 3,747,649 | 7/1973 | Densow | 123/179 SE |
| 3,750,777 | 8/1973 | Thompson | 180/6 R |

Primary Examiner—John P. Silverstrim
Attorney, Agent, or Firm—Merchant, Gould, Smith, Edell, Welter & Schmidt

[57] ABSTRACT

A cleated roller enclosing an internal combustion engine is provided with two handles containing means for engaging the posterior of a skier. The engine is mounted within the roller on a frame which in turn is mounted to both of the roller hubs which are hollow. The roller hubs are connected to the handles. The engine's output shaft is operatively connected to both end walls of the roller so as to rotate the roller relative to the roller hubs. The roller hubs are in direct fluid communication with the atmosphere outside the roller so as to permit efficient cooling of the engine by a forced airflow through the hubs and the roller.

14 Claims, 9 Drawing Figures

PROPULSION UNIT FOR SKIERS

BACKGROUND OF THE INVENTION

1. Field of the Invention

This invention relates to an improved propulsion unit for skiers whereby a roller which is provided with handles is rotated by an engine enclosed within the roller, the engine being supported by a frame attached to the inner roller hubs and the rotation of the roller being utilized to propel a skier across snow covered ground. The inner roller hubs, which are attached to the handles, are in fluid communication with the air outside of the roller so as to permit efficient cooling of the engine located within the roller by means of a forced airflow through the inner hubs and the roller.

2. Description of the Prior Art

It has been known in the art to utilize an engine mounted within a roller wherein the roller is connected to handles containing means for engaging the posterior of a skier to rotate the roller thereby propelling the skier across snow covered ground. The patent to Thompson (U.S. Pat. No. 3,750,777) discloses such a device. The state of the art prior to the issuance of that patent is described and the deficiencies in the prior art devices are indicated in that patent.

The device disclosed in U.S. Pat. No. 3,750,777 has proven to be quite satisfactory and to be an advancement in the art. The present invention, however, contains improvements upon the device disclosed in U.S. Pat. No. 3,750,777 so as to provide for even better operation.

In the prior device, the engine frame was rotatable relative to one of the hubs while being secured from rotation relative to the other hub. The power shaft was connected to only one of the end walls of the roller. The roller had to be opened through an access door in order to start the engine located within the roller. The engine was cooled by airflow induced through the roller by a louvered torque cylinder. And the cleats of the roller extended straight across the roller in a direction perpendicular to the direction of travel.

The present invention has made improvements upon the device disclosed in U.S. Pat. No. 3,750,777 in connection with the above-noted areas.

Summary of the Invention

The invention of the present application solves the problems associated with the prior art devices. While, on the exterior, resembling to some extent the device disclosed in U.S. Pat. No. 3,750,777, the invention of the present application differs greatly from that device due to improvements in the roller and hub areas.

According to the invention of the present application, inner hubs are provided which extend through the end walls of the roller and are attached to the handles. The engine frame located within the roller is attached to each of the inner hubs in such a manner as to be prevented from rotation relative to both of the inner hubs, and thus the handles. The handle — inner hub — engine frame combination thus forms an integral one-piece construction which greatly increases the rigidity of the propulsion unit. The propulsion unit is thus more easily controlled by the skier.

Another feature of the invention of the present application resides in the fact that the output shaft of the engine within the roller is operatively connected to each of the end walls of the roller to drive the roller. In that manner, the stress due to the torque of the engine is evenly distributed to both end walls rather than being concentrated on just one of the end walls.

Still another feature of the invention of the present application is that the inner hubs are in direct communication with the atmosphere outside of the roller. In this manner, the fan of the engine located within the roller is utilized to induce a forced airflow through the roller to cool the engine. The more efficiently cooled engine of the invention of the present application is thus prevented from overheating and the resulting stoppage due to vapor lock.

Yet another feature of the invention of the present application is a provision for pull starter means located exteriorly of the roller to enable the skier to start the engine without having to open doors on the roller.

Still another feature of the invention is the utilization of a roller fabricated from a resilient flexible material. The weight of the roller and the engine contained therein causes the resilient flexible material to sag in the vicinity of its contact with the snow covered surface, thereby increasing the surface area of the roller which is in contact with the snow covered surface at any given time. This increased surface contact, of course, results in greater traction, and therefore more efficiency, for the propulsion unit.

An additional feature of the present invention is to make the roller from two shells. Each shell has a cylindrical portion, one end wall and one open end. An outwardly extending flange is provided on each cylindrical portion and the shells are joined at their open ending by bolting or otherwise connecting the flanges. A rib is thus provided that extends circumferentially around the cylindrical portion of the roller. The rib, in a manner similar to a boat's keel, provides stability to the roller against sidewise slipping when crossing an inclined surface.

These and other novel features of the present invention will be more clearly seen from the following specification.

DETAILED DESCRIPTION OF THE PREFERRED EMBODIMENT

Figure 1:
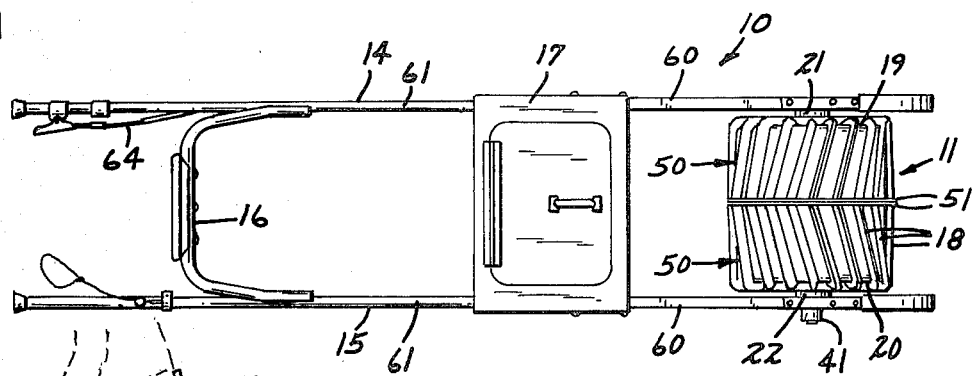
FIG. 1 is a view in top plan of an improved propulsion unit for skiers.

Referring to the drawings, wherein like numerals represent like elements, there is provided a propulsion unit for skiers generally designated as 10. The propulsion unit 10 includes a roller 11 located at its rear portion and first and second handles 14 and 15, respectively, extending forwardly from the roller 11. The forward portion of the handles 14 and 15 contain controls and a transverse member 16 for engaging the posterior of a skier as has been known in the art. Located intermediately of the handles 14 and 15 is a storage box 17, as has also been known in the art. The storage box 17 may be used to house a gas tank or an electric power source.

Figure 2:
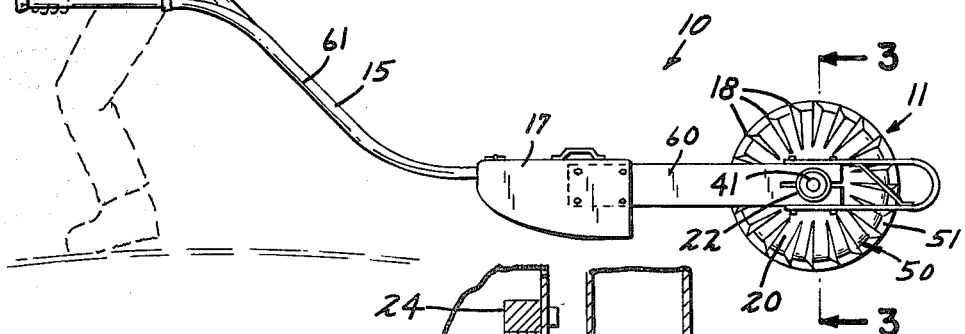
FIG. 2 is a view in side elevation of an improved propulsion unit for skiers.

It is contemplated that the handles 14 and 15 be rigidly connected to first and second inner hubs 21 and 22, respectively. The handles 14 and 15 may take any number of configurations. In one embodiment, that portion of the handles 14 and 15 attached to the inner hubs 21 and 22 comprises a channel member 60 extending forwardly of the roller 11. The forward end of the channel member 60 is attached by bolting or some other appropriate means to the storage box 17, as shown in FIGS. 1 and 2. Tubular portions 61 are also attached to the storage box 17 and extend forwardly therefrom. The tubular portions 61 are curved upwardly to permit engagement with the posterior of a skier by the transverse member 16 connected between the handles 14 and 15. By utilizing this configuration for the handles 14 and 15, the storage box 17 is maintained approximately level with the roller 11 and is there better suited to pack down snow ahead of the roller 11. The handles 14 and 15 may extend rearwardly of the roller 11 and there be joined in wrap-around type fashion. Such a configuration adds additional strength and rigidity to the propulsion unit.

The roller 11 contains a plurality of cleats 18 spaced around its periphery for traction with a snow covered surface. It is contemplated that the cleats 18 be molded into the outer surface of the roller. It has been determined that cleats formed in a chevron pattern operate more efficiently than others. Cleats formed in a chevron pattern have been found to prevent the buildup of snow and ice on the roller.

The roller 11 further includes first and second end walls 19 and 20, respectively, each having a centrally located opening. First and second inner hubs 21 and 22 extend through the holes in the end walls 19 and 20, respectively, and support the inner races of bearings 23. The inner hubs 21 and 22 are hollow tubular members. First and second outer hubs 24 and 25 are rigidly attached by bolting or some other appropriate means to end walls 19 and 20, respectively, within the roller. The outer hubs 24 and 25 are located adjacent the inner hubs 21 and 22, respectively, and support the outer races of bearings 23. In this manner it will be seen that the end walls 19 and 20 and the outer hubs 24 and 25 are rotatable relative to the inner hubs 21 and 22. Handles 14 and 15 are rigidly attached by bolting or some other appropriate means to the inner hubs 21 and 22, respectively, exteriorly of the roller 11.

A generally U-shaped engine frame 26 is bolted or otherwise rigidly attached to both inner hubs 21 and 22. In this manner it will be seen that the handles 14 and 15, the inner hubs 21 and 22 and the engine frame 26 are interconnected to form an integral one-piece construction, thereby adding strength and rigidity to the propulsion unit.

The engine frame 26 supports an internal combustion engine 27 within the roller 11. While many commercially available small engines are suitable for use in conjunction with the present invention, it has been determined that the Tecumseh Model AH817MB, Type 1550, is particularly well-suited for such use. The engine 27 includes an output shaft 28. The engine 27 is mounted to the engine frame 26 by means of a mounting plate 30 through which the output shaft 28 extends. An output sprocket 32 is connected to the output shaft 28 and controlled by means of a centrifugal clutch 33 which causes engagement of the output sprocket 32 with the output shaft 28 at high shaft rotation speeds while permitting disengagement at low, idle shaft rotation speeds.

The engine frame 26 is formed so as to contain a hole 26A adjacent the interior end of the first inner hub 21. An air seal 29 connects the engine 27 to the engine frame 26 in such a manner that the air seal 29 surrounds the hole 26A. In this manner, it will be seen that an air inlet duct 62 is created communicating between the engine 27 and the outside atmosphere through the first inner hub 21.

A jackshaft 34 is journaled in jackshaft bearings 35 supported by the engine frame 26. A sprocket 36 is attached to the jackshaft 34 adjacent the output sprocket 32 and operatively connected thereto by means of a chain 37. End sprockets 38 are attached to either end of the jackshaft 34, one of the end sprockets 38 being located adjacent each of the outer hubs 24 and 25. The outer hubs 24 and 25 have sprockets formed integrally therewith and are operatively connected to the end sprockets 38 by means of drive chains 39. While, in the preferred embodiment described above, the use of a chain drive has been disclosed, it will be understood that a belt drive system wherein the sprockets are replaced by pulleys and the chains by belts would work equally as well.

Figure 9:
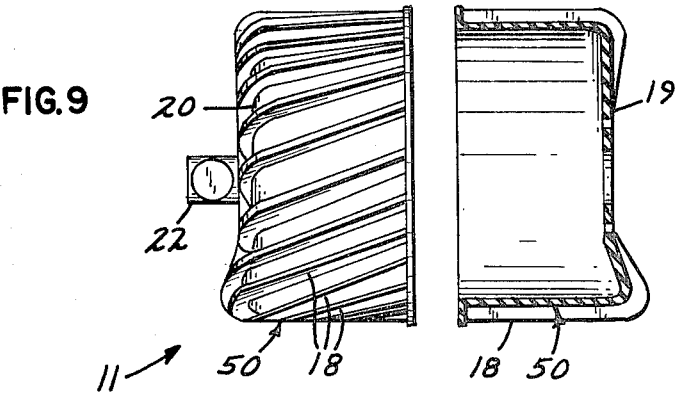
FIG. 9 is a view in side elevation of two shell members which form a roller, one being shown in section.

It is contemplated that the roller 11 be constructed from two shells 50, each having a hollow cylindrical portion, an end wall and an open end, as shown in FIG. 9. Each of the hollow cylindrical portions has an outwardly extending flange 51. The shells 50 are joined at their open ends by means of bolting or otherwise attaching their flanges. The flanges 51 cooperate to define a circumferential rib extending around the roller 11 which operates similarly to a keel to provide the roller with support against movement in a direction other than the direction of rotation of the roller 11.

In one of the preferred embodiments of the present invention, the roller 11 is comprised of a resilient flexible material such as rubber reinforced with fabric, as is well known. The resilient flexible material must be of sufficient strength to support the roller 11 and its internal machinery sufficiently above the ground surface so as not to interfere with the roller's operation. The weight of the propulsion unit 10 will cause a roller made from such a material to sag in the vicinity of contact with the snow covered surface. The result of such sag is to place a greater surface area of the roller in contact with the snow covered surface and to thereby increase the traction obtained from the roller.

It is contemplated that the inner hubs 21 and 22 be hollow tubular members in direct fluid communication with the atmosphere located outside the roller 11. The first inner hub 21 serves as an air inlet passage through which air may be drawn from the outside atmosphere by an engine fan incorporated in the engine 27, but not shown in the drawings. The external airflow so induced is utilized to cool the engine 27. This airflow is exhausted through the second inner hub 22. The engine thus cooled will be less likely to overheat and therefore less likely to stop due to vapor lock than engines utilizing the cooling system of the prior art devices. Associated with the engine 27 is an exhaust pipe 40 and a muffler 41 attached to the exhaust pipe 40. The exhaust pipe 40 and the muffler 41 extend into the second inner hub 22 and are positioned by bracket 31 which is attached to the engine frame 26. In this manner, the muffler (which tends to heat up during operation) is removed from the vicinity of the engine's carburetor. The muffler 41 will also there be cooled by the exit airflow from within the interior of the roller 11. Exhaust gases from the engine 27 are exhausted directly into the outer atmosphere.

The first inner hub 21 is ducted directly to the engine 27. The second inner hub 22 is open ended so as to provide a direct opening between the interior of the roller and the outside atmosphere.

Figure 8:
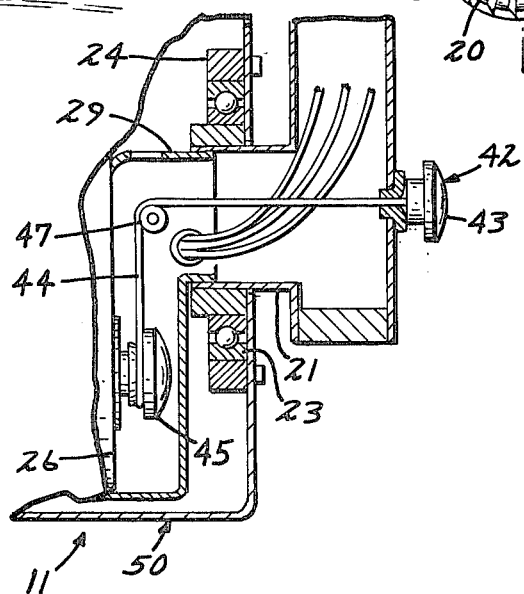
FIG. 8 is a fragmentary view of an alternative embodiment of a portion of FIG. 3.
Figure 3:
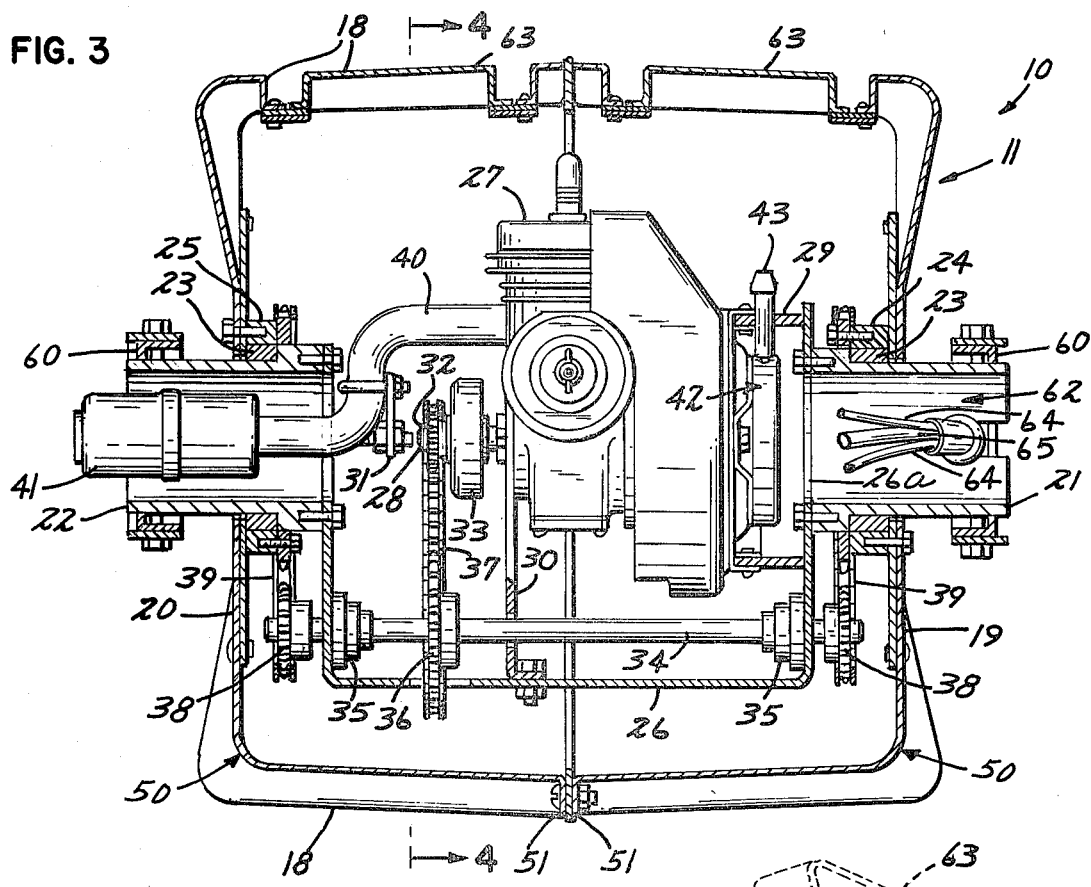
FIG. 3 is a sectional view in rear elevation taken generally along the line 3—3 in FIG. 2, with portions thereof shown in full.
Figure 4:
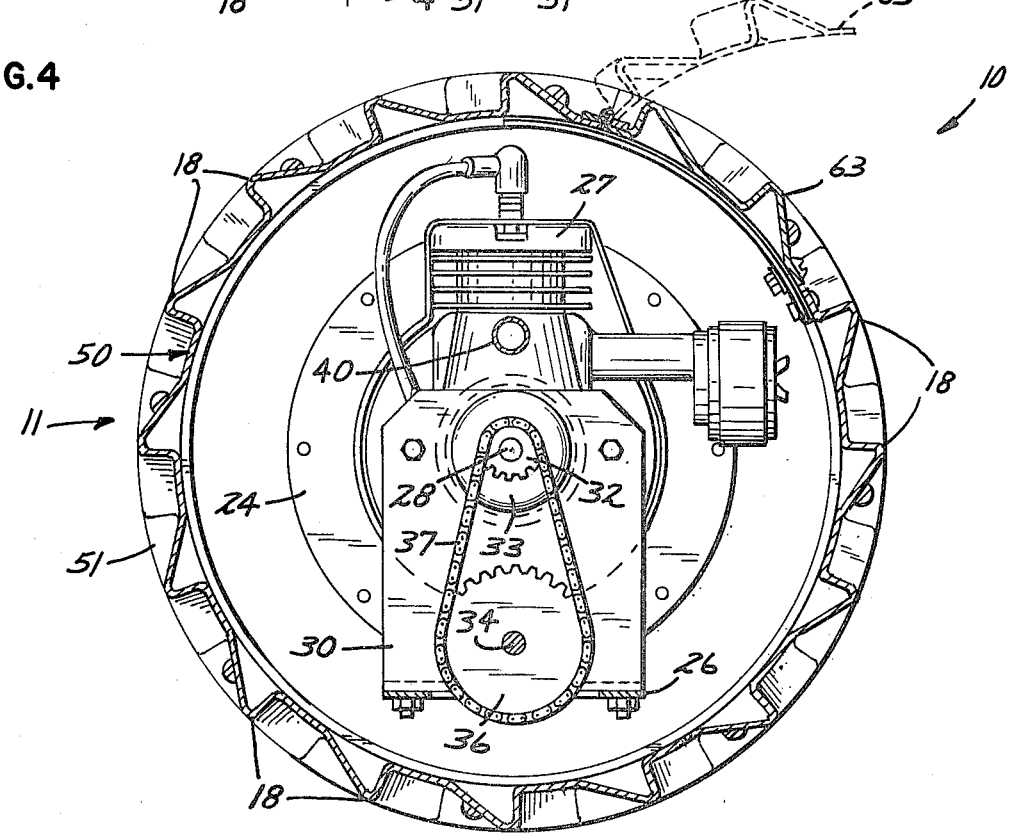
FIG. 4 is a sectional view in side elevation taken generally along the line 4—4 in FIG. 3, with portions thereof shown in full.

It has been known to provide the roller 11 with a door or doors 63 to provide access to the interior of the roller 11 to operate engine starting means 42, such as a pull starter handle 43, extending through a hole in the air seal 29, as seen in FIG. 3. One embodiment of the invention of the present application contemplates the utilization of engine starting means 42 located exteriorly of the roller 11. The engine starting means 42 comprises a pull starter handle 43 located at the outward end of the first inner hub 21 and attached to one end of a starter rope 44 which extends centrally through the first inner hub 21. The starter rope 44 traverses a pulley 47 attached to the engine frame 26 and has its other end attached to a pull starter 45, as seen in FIG. 8.

Figure 7:
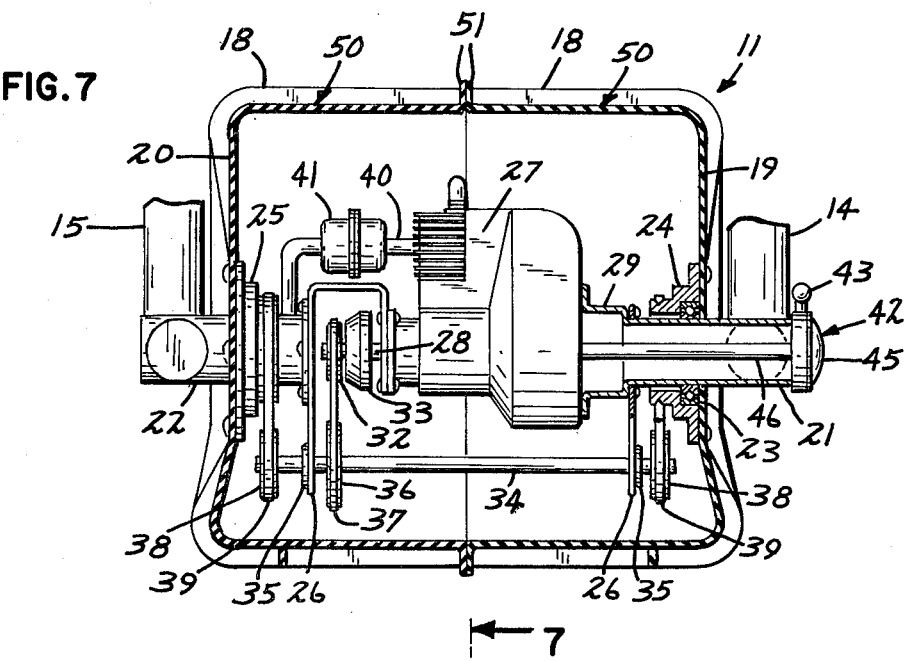
FIG. 7 is a sectional view in rear elevation taken generally along the line 7—7 in FIG. 6.
Figure 6:
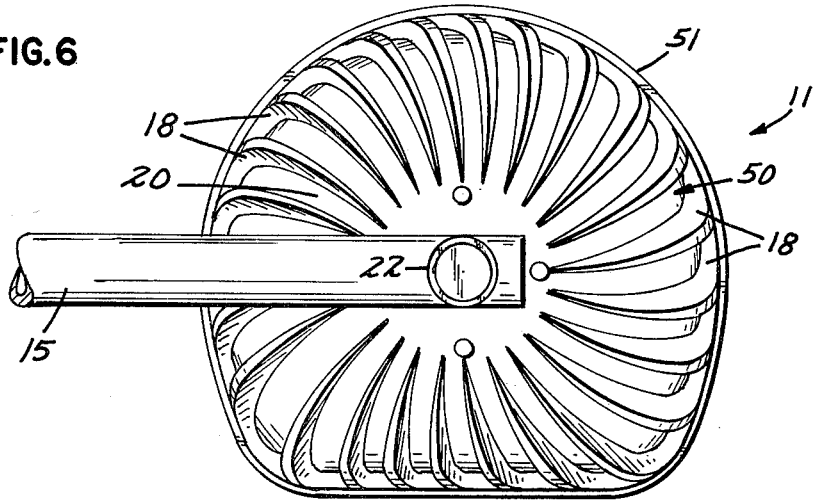
FIG. 6 is a view in side elevation of an alternate embodiment of a roller.
Figure 5:
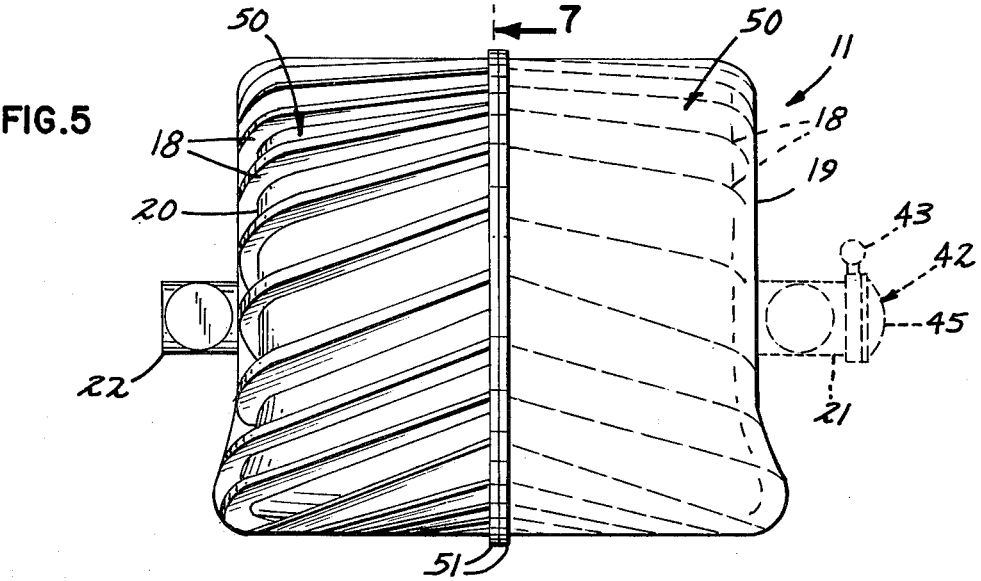
FIG. 5 is a view in rear elevation of an alternate embodiment of a roller.

Another embodiment of the external starting means is disclosed in FIG. 7. The engine 27 includes a crankshaft 46 which extends into the first inner hub 21. A pull starter handle 43 located exteriorly of the roller 11 is connected to the crankshaft extension 46 by means of a starter rope and a conventional pull starter 45. While pull starters have been disclosed, it will be understood that various other starters, such as electric starters, may be utilized in a similar manner.

Engine control cable 64 and a gas supply line 65 extend along the first handle 14 and through the first inner hub 21 into the interior of the roller 11. In the case of a tubular handle 14, the cables 64 and supply line 65 are contained within the handle. In the case of a channel handle 14, the cables 64 and supply line 65 may be clipped or otherwise attached to the interior of the channel.

While preferred configurations and embodiments of the invention have been disclosed herein, other modifications of the invention will be apparent to those skilled in the art in light of the foregoing description. This description is intended to provide concrete examples of specific embodiments which clearly disclose the present invention. Accordingly, the invention is not limited to any particular embodiment. All alternatives, modifications and variations of the present invention which fall within the spirit and scope of the appended claims are covered.

What is claimed is:

1. Improved propulsion unit for skiers comprising:
    (a) a hollow cleated roller of resiliently flexible material including two molded shell members each having an end wall and an open end, said end walls having axially aligned openings therein, at least one of said open ends containing flange means extending around its periphery, and said shell members being joined at their open ends;
    (b) first and second inner hub members extending through the openings in said first and second end walls, respectively, for permitting relative rotation between said inner hub members and said roller;
    (c) first and second handles attached to said first and second inner hub members, respectively;
    (d) an engine frame positioned within said roller and rigidly mounted to said first and second inner hub members so as to secure said engine frame from rotation relative to both of said inner hub members;
    (e) an engine mounted to said engine frame within said roller, said engine including an output shaft; and
    (f) drive means operatively connecting said output shaft to each of said end walls for rotating said roller relative to said inner hub members.

2. Improved propulsion unit according to claim 1 further including means located exteriorly of said roller for starting said engine. SUMMARY OF THE INVENTION 3. Improved propulsion unit according to claim 1 wherein said shell members include a plurality of cleats molded into said shell members.

4. Improved propulsion unit according to claim 1 wherein said inner hub members comprise hollow hubs, said first hub comprising air inlet means ducted to said engine for permitting the passage of air to said engine and said second hub comprising air exhaust means for permitting the passage of air from said roller.

5. Improved propulsion unit according to claim 4 wherein said engine includes a muffler attached to an exhaust pipe connected to said engine, said muffler extending into said second hub.

6. Improved propulsion unit for skiers comprising:
    (a) a hollow cleated roller including first and second end walls, said end walls having axially aligned openings therein;
    (b) first and second inner hub members extending through the openings in said first and second end walls, respectively, for permitting relative rotation between said inner hub members and said roller;
    (c) first and second handles attached to said first and second inner hub members, respectively;
    (d) an engine frame positioned within said roller and rigidly mounted to said first and second inner hub members so as to secure said engine frame from rotation relative to both of said inner hub members;
    (e) an engine mounted to said engine frame within said roller, said engine including an output shaft said engine further includes a crankshaft extending into one of said inner hubs and a pull starter mounted upon said one inner hub member exteriorly of said roller, said pull starter being operatively connected to said crankshaft;
    (f) drive means operatively connecting said output shaft to each of said end walls for rotating said roller relative to said inner hub members.

7. Improved propulsion unit according to claim 1 wherein said drive means comprises:
    (a) first and second outer hub members attached to said first and second end walls, respectively;
    (b) a jackshaft supported by said engine frame within said roller;
    (c) means for operatively connecting said output shaft of said engine to said jackshaft; and
    (d) means for operatively connecting said jackshaft to each of said first and second outer hub members.

8. Improved propulsion unit for skiers comprising:

(a) a hollow cleated roller including first and second end walls, said end walls having axially aligned openings therein;

(b) first and second inner hubs extending through the openings in said first and second end walls, respectively, for permitting relative rotation between said hubs and said roller;

(c) first and second outer hubs attached to said first and second end walls within said roller;

(d) first and second handles attached to said first and second inner hubs, respectively;

(e) means connecting said first and second handles for engaging the posterior of a skier;

(f) an engine frame positioned within said roller and rigidly mounted to said first and second inner hubs so as to secure said engine frame from rotation relative to both of said inner hubs;

(g) an engine mounted to said engine frame within said roller, said engine including an output shaft and a crankshaft extending into one of said inner hubs;

(h) a jackshaft supported by said engine frame within said roller;

(i) means operatively connecting said output shaft to said jackshaft;

(j) means operatively connecting said jackshaft to said first and second outer hubs for applying engine torque to each of said end walls; and (k) pull starter means located exteriorly of said roller and operatively connected to said engine crankshaft exteriorly of said roller for starting said engine.

9. Improved propulsion unit according to claim 8 wherein said roller comprises a resilient flexible material.

10. Improved propulsion unit according to claim 8 wherein said inner hub members comprise hollow hubs, said first hub comprising air inlet means ducted to said engine for permitting the passage of air to said engine and said second hub comprising air exhaust means for permitting the passage of air from said roller.

11. Improved propulsion unit according to claim 10 wherein said engine includes a muffler attached to an exhaust pipe connected to said engine, said muffler extending into said second tubular member.

12. Improved propulsion unit according to claim 8 wherein said outer hubs comprise sprockets and wherein said means for applying engine torque to each of said end walls includes drive chains engaging said sprockets.

13. Improved propulsion unit according to claim 8 wherein said outer hubs comprise pulleys and wherein said means for applying engine torque to said end walls includes drive belts engaging said pulleys.

14. Improved propulsion unit according to claim 8 wherein said pull starter means comprises:

(a) a pull starter mechanism operatively connected to said engine;

(b) a handle located exteriorly of said roller; and (c) a starter rope extending through one of said inner hubs, said starter rope being connected to said pull starter mechanism and said handle.

* * * * *

UNITED STATES PATENT AND TRADEMARK OFFICE
CERTIFICATE OF CORRECTION

PATENT NO. : 4,096,919
DATED : June 27, 1978
INVENTOR(S) : Richard G. Thompson

It is certified that error appears in the above-identified patent and that said Letters Patent are hereby corrected as shown below:

In claim 2, lines 3 and 4 please delete "SUMMARY OF THE INVENTION.

*Signed and Sealed this*

*Fourteenth* Day of *November 1978*

[SEAL]

Attest:

RUTH C. MASON
*Attesting Officer*

DONALD W. BANNER
*Commissioner of Patents and Trademarks*